United States Patent
Dubois

(10) Patent No.: US 12,164,427 B2
(45) Date of Patent: Dec. 10, 2024

(54) DATA FLOW MONITORING IN A MULTIPLE CORE SYSTEM

(71) Applicant: NXP B.V., Eindhoven (NL)

(72) Inventor: Antoine Fabien Dubois, Austin, TX (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/187,014

(22) Filed: Mar. 21, 2023

(65) Prior Publication Data

US 2023/0236976 A1 Jul. 27, 2023

Related U.S. Application Data

(62) Division of application No. 17/301,526, filed on Apr. 6, 2021, now Pat. No. 11,620,221.

(51) Int. Cl.
*G06F 12/08* (2016.01)
*G06F 12/0815* (2016.01)
*G06F 13/28* (2006.01)
*G06F 13/40* (2006.01)

(52) U.S. Cl.
CPC .......... *G06F 12/0815* (2013.01); *G06F 13/28* (2013.01); *G06F 13/4027* (2013.01)

(58) Field of Classification Search
CPC ... G06F 12/0815; G06F 13/4027; G06F 13/28
See application file for complete search history.

(56) References Cited

U.S. PATENT DOCUMENTS

| | | | |
|---|---|---|---|
| 8,373,435 B2* | 2/2013 | Bogenberger | G06F 11/165 326/14 |
| 2017/0190358 A1* | 7/2017 | Kobayashi | B62D 6/10 |
| 2020/0104204 A1* | 4/2020 | Nautiyal | G06F 11/0772 |

* cited by examiner

*Primary Examiner* — David E Martinez
(74) *Attorney, Agent, or Firm* — Joanna G. Geld

(57) ABSTRACT

An integrated circuit includes a functional core configured to execute functional logic instructions; a functional memory device coupled to the functional core; a safety core configured to execute safety check logic instructions; a monitored address memory device coupled to the functional core and the safety core, the monitored address memory device configured to store memory addresses to be monitored; and a first safety memory device coupled to the functional memory device and the safety core. When a value in one of the monitored memory addresses changes, the changed value of the one of the monitored memory addresses is stored in the functional memory device and in the first safety memory device. The safety core performs a safety check on the changed value of the one of the monitored memory addresses stored in the first safety memory device.

7 Claims, 4 Drawing Sheets

DATA FLOW MONITORING IN A MULTIPLE CORE SYSTEM

CROSS-REFERENCE TO RELATED APPLICATIONS

This application claims the priority under 35 U.S.C. § 119 of application Ser. No. 17/301,526, filed on 6 Apr. 2021, the contents of which are incorporated by reference herein.

BACKGROUND

Field

This disclosure relates generally to multiple core (multi-core) systems, and more specifically, to data flow monitoring in a multi-core system.

Related Art

Functional safety is important in a variety of data processing system applications, and especially in safety critical applications such as in automotive or medical applications. For example, it is critical that these systems operate correctly because failed operation can lead to dire consequences, such as loss of life. Within a data processing system, safety checks may be used to verify that selected outputs in the system are providing reasonable or expected values. Within single core data processing systems, such safety checks can be performed to check outputs of each function in which functions generally share timers and memory accesses, making it easy to synchronize safety checks with the functions. However, in multiple core (multi-core) systems, synchronization between multiple operating system domains is difficult and memory accesses may be isolated and thus not observable.

In one known system, functional applications write results into a shared memory, however, this requires that the core performing a functional application performs additional writes, and there is also no guarantee that the data being written to the shared memory is actually the same data being used within the functional application. Furthermore, synchronization between the functional applications and the checkers is difficult to achieve. Therefore, a need exists for improved safety checks within a multi-core data processing system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In a multi-core system which includes at least one functional core and a safety core, safety relevant data flow monitoring is performed at the system level to ensure the functional safety of the multi-core system. The multi-core system includes functional memory which is used by the functional core to perform its functional algorithms and a safety memory which is used by the safety core to perform safety checks and any other safety-related operations and applications. In one aspect, a set of addresses within the functional memory that are to be monitored is stored within the multi-core system. A data flow monitor (DFM) monitors the contents of the set of addresses within the functional memory. In response to the contents of one of the monitored addresses being updated, an indication of such is provided to a safety direct memory access (DMA) which copies the updated contents from the functional memory into the safety memory. The safety memory also stores an indication of the monitored address corresponding to the updated contents and may also store a corresponding time stamp obtained from a dedicated safety timer used by the safety DMA. This stored information within the safety memory may then be used by a safety checker within the safety core to determine if the at least one functional cores are operating in a safe manner.

Figure 1:
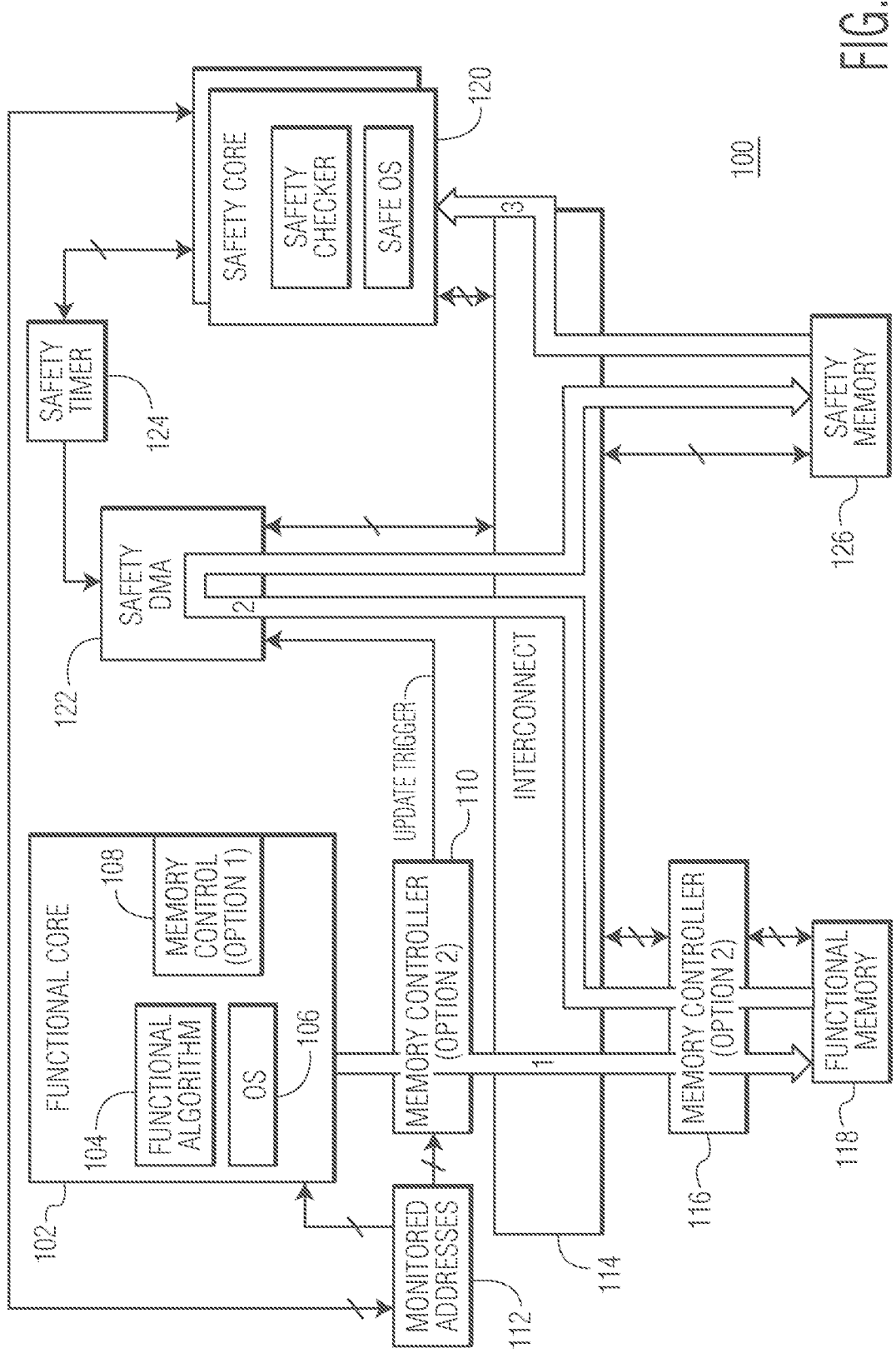
FIG. 1 illustrates, in block diagram form, a multi-core system in accordance with one embodiment of the present invention.

FIG. 1 illustrates, in block diagram form, a multi-core data processing system 100 in accordance with one embodiment of the present invention. System 100 can be implemented as a System on a Chip (SoC) (and may also be referred as an integrated circuit). System 100 includes a functional core 102 (also referred to as a functional processing core), a functional memory 118 (also referred to as a functional memory device), a safety core 120 (implemented as a lockstep core in the illustrated embodiment and may also be referred to as a safety processing core), a safety DMA controller 122 (also referred to as a DMA or safety DMA), a safety timer 124, a safety memory 126 (also referred to as a safety memory device), an interconnect 114, and storage 112 configured to store a set of monitored addresses. System 100 may also include a memory controller 110 coupled between function core 102 and interconnect 114 or a memory controller 116 coupled between interconnect 114 and functional memory 118 (or system 100 may include both memory controllers 110 and 116). Safety DMA 122, safety core 120, and safety memory 126 may also be bidirectionally coupled to interconnect 114.

In alternate embodiments, system 100 may include greater or fewer elements than illustrated in FIG. 1. For example, system 100 may include any number of elements, such as any number of functional cores, additional peripherals (such as additional memories, DMAs, input/output devices, or other peripherals), etc. Functional core 102 may be any type of core, including any type of microcontroller, and is configured to execute instructions, e.g. functional logic instructions. Core 102 may also be referred to as a central processing unit (CPU). Functional core 102 executes a corresponding operating system (OS) and performs functional algorithm 104. Functional algorithm 104 may include any number of functions performed within functional core 102 to perform its application operations. Core 102 also includes any type of circuitry, as needed, to perform the functions. Core 102 may also include a local memory controller 108, which may include, for example, a memory management unit (MMU) or debug circuitry. Safety core 120 may also be any type of core, and also executes a corresponding safe OS. Safety core 120 performs safety related operations (such as by executing instructions, e.g. safety check logic instructions), and includes, for example, a safety checker which can perform one or more safety checks within system 100 (such as by executing instructions, e.g. safety check logic instructions). Safety core 120 includes any type of circuitry, as needed, to perform its safety related operations.

Interconnect 114 can be any type of interconnect, such as, for example, a bus, crossbar switch, or any type of interconnect fabric. Interconnect 114 can also be implemented as multiple interconnects. Safety timer 124 is coupled to safety DMA 122 and may also be coupled to safety core 120. In the illustrated embodiment, memory controller 110 provides an Update Trigger signal to safety DMA 122. Storage 112 is accessible by memory controller 110 and is also coupled to safety core 120. Safety DMA 122, safety memory 126, and safety core 120 are each coupled to interconnect 114. Storage 112 can be any type of storage (such as a buffer or registers), and memories 118 and 126 can be any type of memory, such as a static random access memory (SRAM), magneto-resistive memory (MRAM), flash memory, etc.

Figure 2:
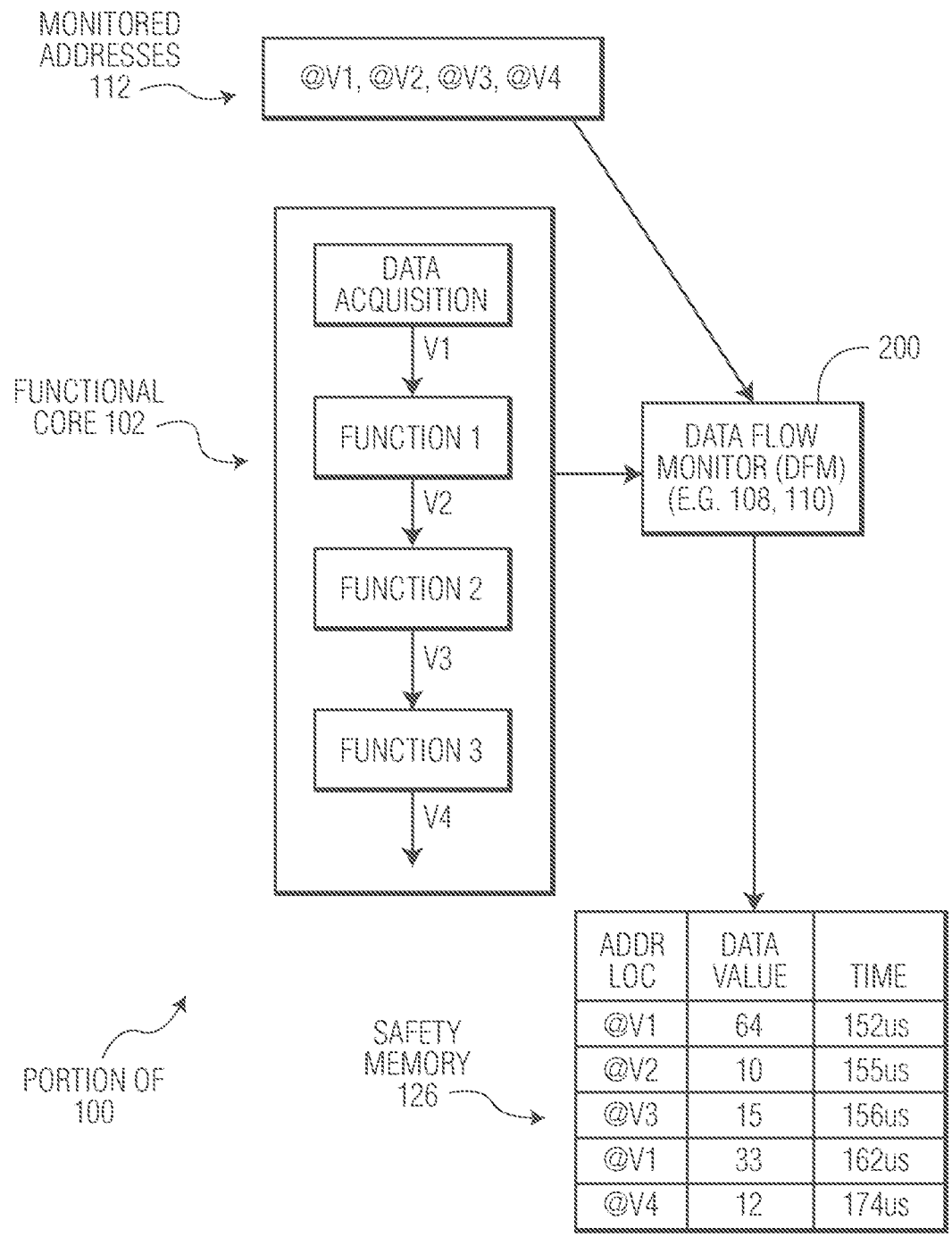
FIG. 2 illustrates, in diagrammatic form, operation of a data flow monitor (DFM) of the multi-core system of FIG. 1, I accordance with one embodiment of the present invention.

Operation of system 100 will be described in reference FIGS. 2 and 3. Referring first to FIG. 2, FIG. 2 illustrates operation of a data flow monitor (DFM) 200 implemented with various elements of system 100. As an example, in FIG. 2, storage 112 stores a set of addresses which are to be monitored (i.e. a set of monitored addresses). Each address to be monitored is an address of functional memory 118, and they are selected in order to check safety relevant data flow of system 100 (therefore, a monitored address may also be referred to as a monitored safety address). They can be selected by a programmer of system 100 and stored to storage 112 by safety core 120. In the illustrated embodiment, this set of monitored addresses includes the addresses (i.e. address locations) of variables V1, V2, V3, and V4 in functional memory 118. These variables may be used in functional logic instructions executed within functional core 102, such as by any of the functional algorithms 104. Note that the "@" preceding a variable name indicates the addresses of the variable. For example, @V1 refers to the value of the address location within functional memory 118 at which the value of the variable V1 is stored. Similarly, @V2 refers to the value of the address location within functional memory 118 at which the value of V2 is stored.

In the illustrated embodiment, functional core 102 performs data acquisition (such as via an input/output port of system 100) to obtain data. The acquired data includes variable V1 which is stored at @V1. Core 102 performs Function 1 using V1 to obtain V2, which is stored at @V2. Core 102 performs Function 2 using V2 to obtain V3, which is stored at @V3, and performs Function 3 using V3 to perform V4. These functions can be any functions performed by core 102 (including functions performed by executing functional logic instructions, e.g. software instructions). Although each function is illustrated as using a single input to obtain a single output, the function may use any number of inputs and generate any number of outputs, depending on the required operations of the function.

DFM 200 accesses storage 112 to determine which addresses are to be monitored. As core 102 executes its functions (e.g. functional algorithm 104), DFM 200 determines whether the contents of any of the monitored addresses has been updated (i.e. changed). Anytime the contents of a monitored address is updated, the updated value is stored to safety memory 126 along with its corresponding monitored address location as well as a corresponding time stamp. Referring to FIG. 2, at time 152 microseconds (us), V1=64 was stored at @V1. Since the contents of @V1 was updated, an entry was created in safety memory 126 for this update including the monitored address location @V1, the updated contents 64, and the corresponding time stamp 152. At time 155 us, V2=10 was stored at @V2, resulting in creation of another entry in safety memory 126 to store the monitored address location @V2, the updated contents 10, and the corresponding time stamp 155. Similar entries are created when @V3 is updated at time 156 us with the value 15, when @V1 again is updated but with value 33 at time 162 us, and when @V4 is updated with the value 12 at time 174 us. In one embodiment, the entries in safety memory 126 are stored in the order in which the contents of the monitored addresses are updated or changed.

Note that the creation of these entries within safety memory 126 to capture the safety relevant data flow does not require any writes or any additional operation by functional core 102. That is, the monitoring of the set of addresses is performed without intervention or interruption of the normal operation of core 102. Instead, safety DMA 122 will be triggered when the contents of any of the monitored addresses is updated and, in response thereto, will update safety memory 126 accordingly. Core 102 is not responsible for updating safety memory 126 upon such a trigger. As will be described in reference to FIG. 3, DFM 200 may include various elements of system 100 to implement the monitoring, such as one or more memory controllers 108, 110, and 116, safety DMA 122, timer 124, and safety memory 126. The bold arrows in FIG. 1 correspond to different data flows during the operation of FIG. 1 and will be referred to in the flow diagram of FIG. 3.

Figure 3:
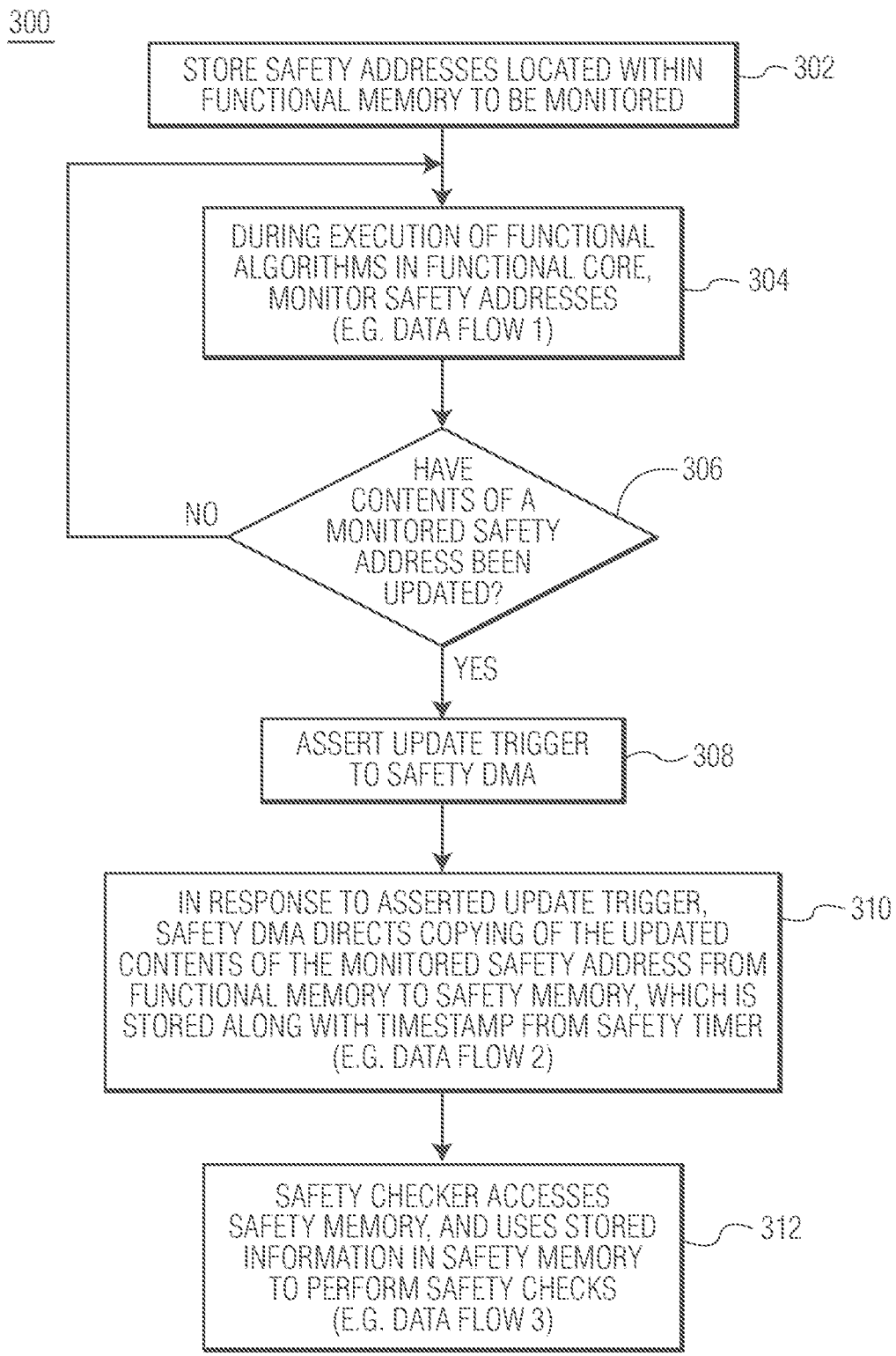
FIG. 3 illustrates, in flow diagram form, operation of safety checks within the multi-core system of FIG. 1, in accordance with one embodiment of the present invention.

FIG. 3 illustrates, in flow diagram form, a method 300 of an example operation within system 100. At the beginning of method 300 (in 302), a set of safety addresses to be monitored located within functional memory 118 is stored within storage 112. During execution of the functional algorithm (e.g. functional algorithm 104, including one or more functions) in the functional core, the stored safety addresses are monitored (304). In the illustrated embodiment, this is represented by data flow 1 in which values are being written to functional memory 118 during operation of core 102, and the address locations for the writes are being monitored by memory controller 110. Memory controller 110 can access storage 112 to determine which are the addresses being monitored. In one embodiment, this monitoring by controller 110 can be done through the use of an IOMMU or a resource domain controller. Alternatively, this monitoring may be done by controller 116, such as through the use of an IOMMU or a resource domain controller. Alternatively, this monitoring may be done my memory controller 108 through the use of an MMU within core 102 or even through the use of debug circuitry. For example, debug circuitry within core 102 may have the ability to monitor address locations during debug, in which this functionality can be reused during normal operation for monitoring the addresses stored in storage 112 instead. Note that any of the controllers which perform the monitoring would need to be able to access the stored addresses in storage 112.

Referring back to FIG. 3, at decision diamond 306, it is determined whether the contents of a monitored safety address has been updated. If not, DFM 200 continues to monitor the safety addresses (and thus method 300 returns to block 304). However, if the contents of any of the monitored safety addresses has been updated, the Update Trigger signal is asserted to safety DMA 122 (308). (In the example of FIG. 1, this is done by memory controller 110 which is monitoring the safety addresses stored in storage 112. Alternatively, different elements within system 100 may assert the Update Trigger signal, depending on how the monitoring is implemented and which element within system 100 is performing the monitoring, such as controller 108 or 116.) In one embodiment, the monitored memory address whose contents changed is provided along with assertion of the Update Trigger signal.

In response to the asserted Update Trigger signal, safety DMA 122 directs copying of the updated contents of the monitored safety address (which resulted in assertion of the Update Trigger) from functional memory 118 to safety memory 126 (310). This is represented by data flow 2 in which safety DMA 122 controls the copying of data from memory 118 to memory 126. In one embodiment, safety DMA 122 controls the copying of the data by requesting the updated contents of the monitored safety address from functional memory 118 and storing the updated contents from safety DMA 122 to safety memory 126. Alternatively, additional or different steps may be used by safety DMA 122 to control the copying. Therefore, safety DMA 122 creates a new entry in safety memory 126 similar to the entries created in safety memory 126 in the example of FIG. 2. Since safety DMA 122 has access to the dedicated safety timer 124, it can save a time stamp with each content update of any of the monitored safety addresses. Since the safety timer 124 can be used for each of the time stamps, there is no issue with synchronizing different timers of different operating system domains.

The safety checker in safety core 120, at any time, can use the stored information in safety memory 126 to perform safety checks of system 100 (312). This is represented by data flow 3 in FIG. 1 in which the safety checker has access to the entries stored within safety memory 126. In one embodiment, the entries are stored as a first in first out (FIFO) within safety memory 126. Alternatively, multiple FIFOs may be used to store the entries. The safety checker, using the entries in safety memory 126, can check various aspects such as, for example, if a variable has been updated within an expected frequency range or if a variable is within an appropriate range of values. In other embodiments, rather than DFM 200 monitoring individual address locations, DFM 200 can monitor a range of addresses or may be set up such that only a subset of the updates to an address location are copied to safety memory 126 (e.g. such as only every tenth update of V2). In this case, safety DMA 122 may also include additional circuitry, such as counters or timers, as needed for the various aspects being checked. Note also that executing functional logic instructions (i.e. performing the functional algorithms) in functional core 102 is performed independently from performing the safety checks in safety core 120.

Figure 4:
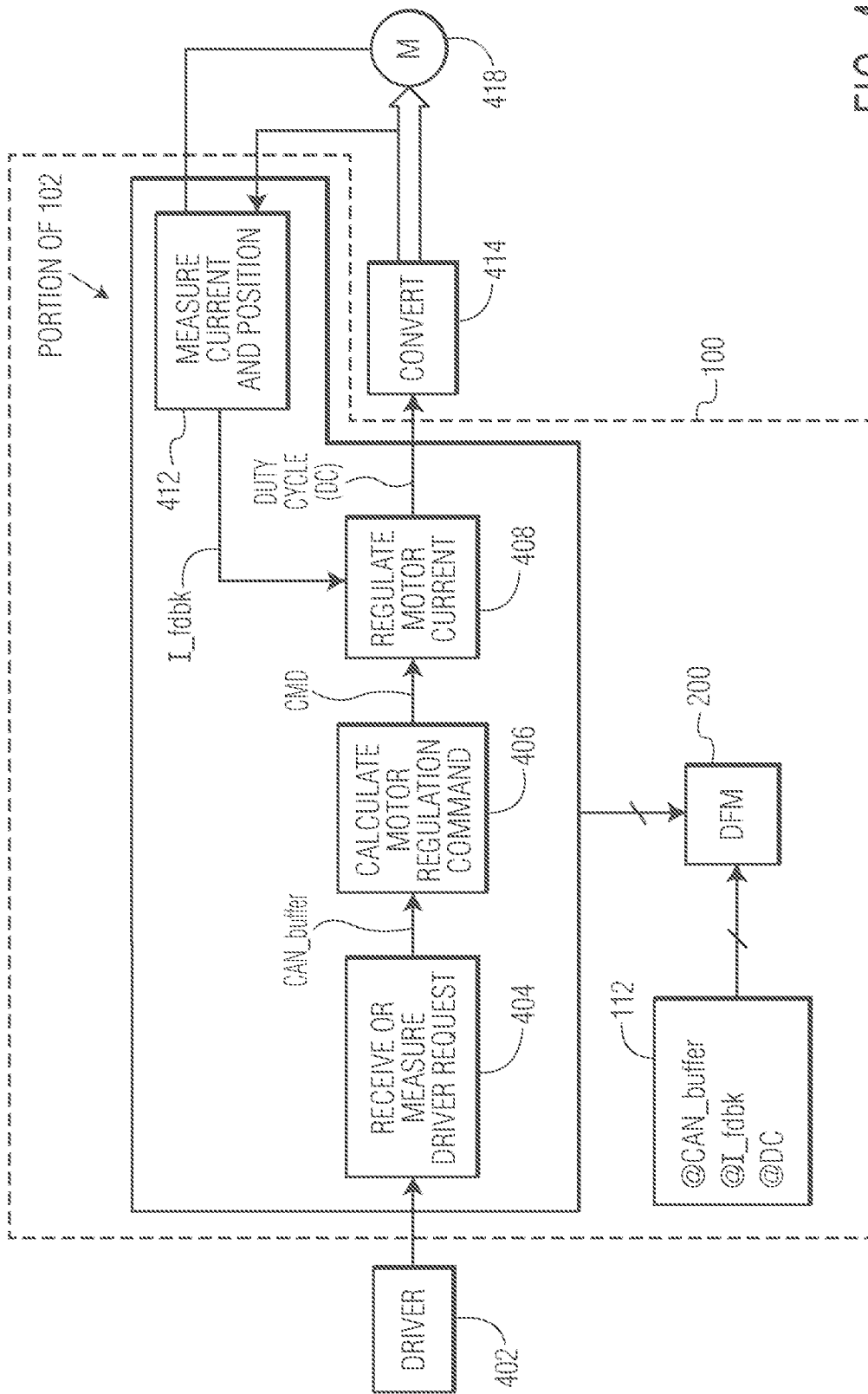
FIG. 4 illustrates, in block diagram form, a more specific example of the multi-core system of FIG. 1, in accordance with one embodiment of the present invention.

FIG. 4 illustrates, in block diagram form, a particular example of a motor control application for system 100 within an automotive control area network (CAN), in accordance with one embodiment of the present invention. in FIG. 4, system 100 may be used to control a motor 418. A driver 402 is coupled to provide inputs to functional core 102. A portion of functional core 102 includes a receive or measure driver request circuit 404 which can store received or measured values in a CAN buffer. These values are used by circuit 406 to calculate motor regulation commands, which are provided as CMD to circuit 408 which regulates the motor current using a feedback current, I_fdbk. An output of circuit 408 (corresponding also to an output of system 100) provides a duty cycle (DC) to converter 404, which is coupled to motor 418. Core 102 measures current and position of motor 418 with circuit 412, and provides I_fdbk back to circuit 408 to regulate the motor current. Note that driver 402, converter 414, and motor 418 are located external to system 100.

In the embodiment of FIG. 4, safety checkers within safety core 120 (not illustrated in FIG. 4) may monitor different data points within the functions of the motor control of core 102. For example, during safe operation, the values in CAN_buffer must be updated every 100 ms, I_fdbk must be less than the safe operating area (SOA) value, and DC must be between 0 and 100. Therefore, the address values of CAN_buffer (@CAN_buffer), I_fdbk (@I_fdbk), and DC (@DC) can be stored into storage 112. DFM 200 can therefore monitor these address locations and update safety memory 126 whenever the contents of any of these addresses is updated. For example, in response to any update of these contents, safety DMA 122 is triggered to copy the updated contents to a new entry of safety memory 126 (as in the example of FIG. 2).

Continuing with the example of FIG. 4, the information stored in safety memory 126 in response to monitoring of the addresses in storage 112 can be used by safety checkers in safety core 120. A first checker can use the stored information to determine whether or not @CAN_buffer was properly updated every 100 ms. A second checker can use the stored information to determine if I_fdbk has remained below the SOA value, and a third checker can use the stored information to determine if DC is between 0 and 100. If any of these checkers indicates a failure, then a functional safety issue within system 100 is indicated.

Therefore, the data flow within any address locations within system 100 can be monitored by DFM 200 and stored within safety memory 126, and safety core 120 may include any number of checkers capable of checking various safety related conditions using the information stored in safety memory 126. Due to the use of DFM 200 which uses a safety DMA (which may be dedicated for use in DFM 200), the functional cores such as core 102 do not need to perform any writes or data movement to perform the data monitoring and do not need to be synchronized with any other functional core or the safety core. Furthermore, any software executed by a functional core need not be modified to perform the monitoring.

By now it should be appreciated that there has been provided a DFM for a multi-core system (with one or more functional cores and a safety core) which can monitor system level data flow to detect safety faults. In one embodiment, the DFM includes circuitry which monitors a set of selected safety addresses within a functional memory, and in response to the contents of any of the monitored safety addresses being updated, a trigger signal is asserted to a safety DMA. In response thereto, the safety DMA, without use of any of the functional cores, copies the updated contents from the functional memory to an entry in a safety memory. For each entry of the safety memory, the safety DMA can store the updated data value, the corresponding safety address, and a corresponding time stamp (which can be provided by a dedicated safety timer). Note that each entry can store more, less, or different information, as needed. In this manner, a user of system 100 need not modify the software executing on the functional cores to implement the safety related data flow monitoring. That is, by storing safety related addresses within any functional memory of system 100 into a storage location for use by the DFM, the data flow can be monitored without introducing extra instructions or other changes into the software.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of system 100 are circuitry located on a single integrated circuit or within a same device. Alternatively, system 100 may include any number of separate integrated circuits or separate devices interconnected with each other. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the information within safety memory 126 can be organized in different ways rather than as a buffer or a FIFO and each entry may include additional or less information. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, an integrated circuit device includes a functional core configured to execute functional logic instructions; a functional memory device coupled to the functional core; a safety core configured to execute safety check logic instructions; a monitored address memory device coupled to the functional core and the safety core, the monitored address memory device configured to store memory addresses to be monitored; and a first safety memory device coupled to the functional memory device and the safety core. When a value in one of the monitored memory addresses changes, the changed value of the one of the monitored memory addresses is stored in the functional memory device and in the first safety memory device, and the safety core performs a safety check on the changed value of the one of the monitored memory addresses stored in the first safety memory device. In one aspect, the integrated circuit device further includes a safety timer coupled to the safety core, the safety timer providing a timestamp corresponding to a time when the one of the monitored memory addresses changed. In a further aspect, the timestamp for the changed value of the one of the monitored memory addresses is stored in the first safety memory device along with the changed value in the monitored memory address and the one of the monitored memory addresses. In another aspect, changed values of the monitored memory addresses are stored in the first safety memory device in the order they are changed. In another further aspect, the integrated circuit device further includes a memory controller coupled between the monitored address memory device and the first safety memory device, the memory controller configured to issue an update trigger when the value of the one of the monitored memory addresses changes. In a further aspect, the integrated circuit device further includes a safety direct memory access (DMA) controller coupled between the memory controller and the first safety memory device, wherein memory controller is configured to provide the update trigger and the one of the monitored memory addresses corresponding to the changed value to the safety DMA controller. In yet a further aspect, the safety DMA controller is configured to request the changed value corresponding to the one of the monitored memory addresses from the functional memory. In an even further aspect, the integrated circuit device further includes a second memory controller coupled in communication with the functional core and the functional memory device, wherein, upon receipt of the update trigger, the safety DMA controller requests the changed value corresponding to the one of the monitored memory addresses from the functional memory through the second memory controller. In another even further aspect, the safety DMA controller is configured to provides the timestamp, the changed value of the one of the monitored memory addresses, and the one of the monitored memory addresses, to the safety memory device. In another aspect of the above embodiment, the monitored memory addresses correspond to variables in the functional logic instructions that are used to determine whether a device with which the integrated circuit device is used is operating safely.

In another embodiment, a device includes an integrated circuit configured to monitor parameters used to control operation of the device. The integrated circuit includes an interconnect; a functional core coupled to the interconnect; a functional memory coupled to the interconnect; a safety core coupled to the interconnect; a safety memory coupled to the interconnect; a stored list of monitored memory addresses of the functional memory; a memory controller coupled to the stored list of monitored memory addresses, wherein the memory controller is configured to issue an update trigger when a value in one of the monitored memory addresses changes; a safety direct memory access (DMA) controller configured to receive the update trigger and to request the value in the one of the monitored memory addresses from the functional memory upon receipt of the update trigger and to store the changed value in the safety memory. In one aspect, the device further includes a safety timer coupled to the safety DMA controller, the safety timer configured to provide a timestamp when the DMA controller receives the update trigger. In a further aspect, the DMA controller is configured to provide the one of the monitored memory addresses corresponding to the changed value, the changed value, and the timestamp to the safety memory. In another aspect of the another embodiment, the device further includes safety check logic instructions configured to execute in the safety core, the safety check logic instructions further configured to retrieve the changed value from the safety memory and use the changed value to determine whether the device is operating in a safe manner.

In yet another embodiment, a method for monitoring data in a processing system includes storing addresses be monitored, wherein the addresses are located in a functional memory device; during execution of functional logic instructions in a functional processing core, monitoring the addresses. When contents of one of the addresses is updated in the functional memory device, the method further includes asserting an update trigger to a safety direct memory access (DMA) controller; in response to the update trigger being asserted, the safety DMA controller requesting the updated contents from the functional memory device, and storing the updated contents from the safety DMA controller to a safety memory device; using the updated contents in the safety memory device to perform safety checks in a safety processing core. In a further aspect, the method further includes providing a timestamp to a safety DMA controller when the update trigger is received. In a further aspect, the method further includes storing the timestamp and the one of the addresses along with the updated contents in the safety memory device. In another aspect, the method further includes using a memory controller coupled to the functional memory to determine when the contents of the one of the addresses is updated. In another aspect, the method further includes using a memory controller coupled to the addresses to be monitored to assert the update trigger. In yet another aspect, the method further includes executing the functional logic instructions in the functional processing core independently of performing the safety checks in the safety processing core.

The invention claimed is:

1. A method for monitoring data in a processing system comprising:
   storing addresses to be monitored, wherein the addresses are located in a functional memory device;
   during execution of functional logic instructions in a functional processing core, monitoring the addresses;
   when contents of one of the addresses is updated in the functional memory device:
   asserting an update trigger to a safety direct memory access (DMA) controller;
   in response to the update trigger being asserted, the safety DMA controller requesting the updated contents from the functional memory device, and storing the updated contents from the safety DMA controller to a safety memory device;
   using the updated contents in the safety memory device to perform safety checks in a safety processing core.

2. The method of claim 1 further comprising:
   providing a timestamp to the safety DMA controller when the update trigger is received.

3. The method of claim 2 further comprising:
   storing the timestamp and the one of the addresses along with the updated contents in the safety memory device.

4. The method of claim 1 further comprising:
   using a memory controller coupled to the functional memory to determine when the contents of the one of the addresses is updated.

5. The method of claim 4, wherein the memory controller asserts the update trigger to the safety DMA controller.

6. The method of claim 1 further comprising:
using a memory controller coupled to storage configured to store the addresses to be monitored to assert the update trigger.

7. The method of claim 1 further comprising:
executing the functional logic instructions in the functional processing core independently of performing the safety checks in the safety processing core.

* * * * *